May 2, 1961 J. H. EGGINK 2,982,471
EGG COUNTING DEVICE
Filed June 11, 1959 2 Sheets-Sheet 1
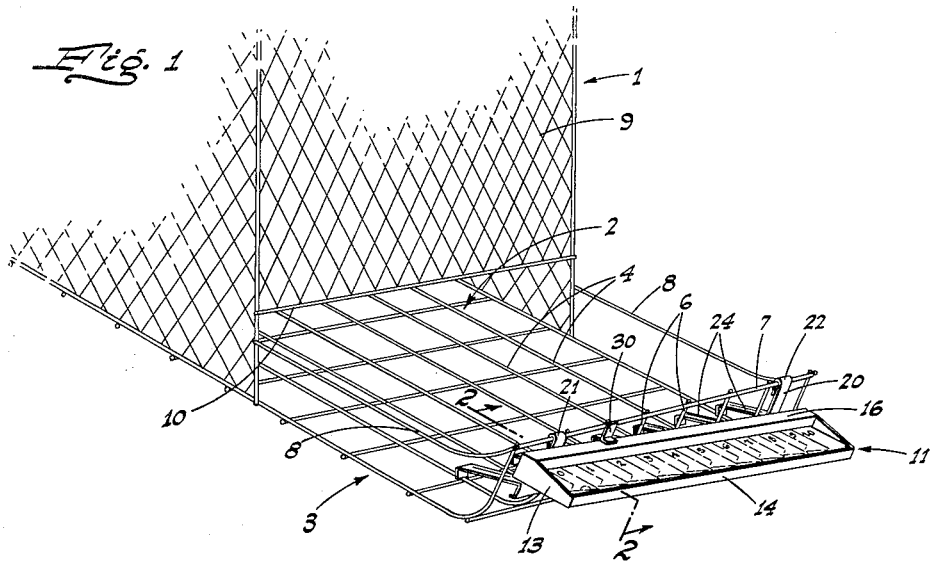
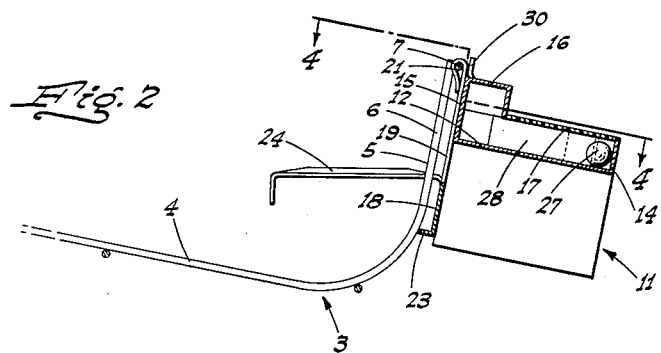
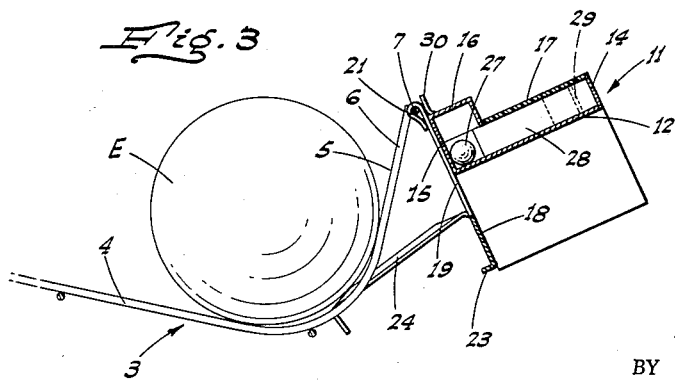
INVENTOR.
James H. Eggink
BY
Webster & Webster
ATTYS.

May 2, 1961 J. H. EGGINK 2,982,471
EGG COUNTING DEVICE
Filed June 11, 1959 2 Sheets-Sheet 2
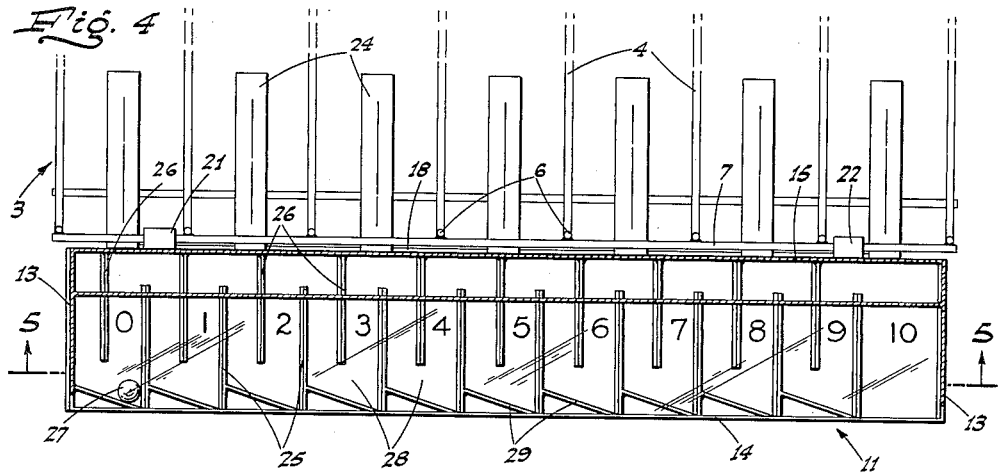
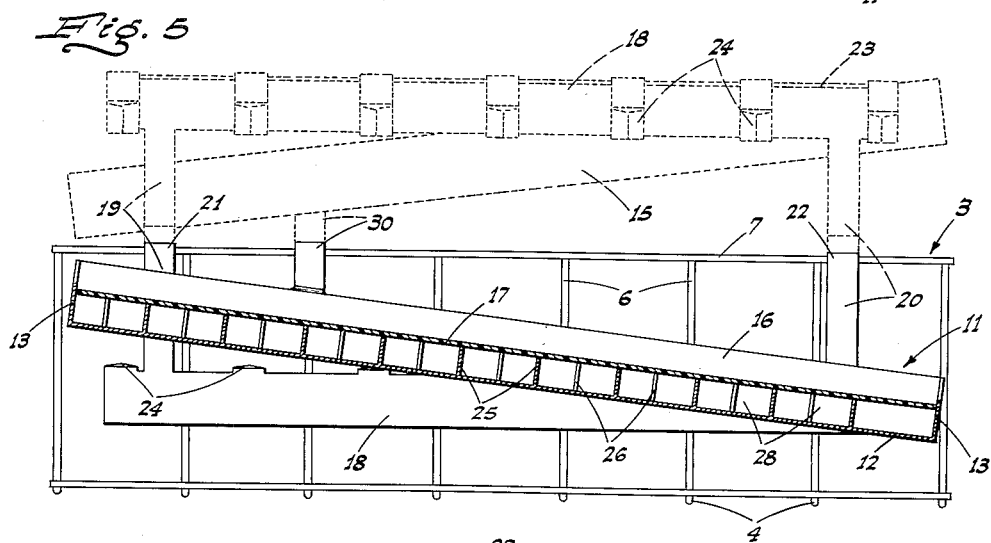
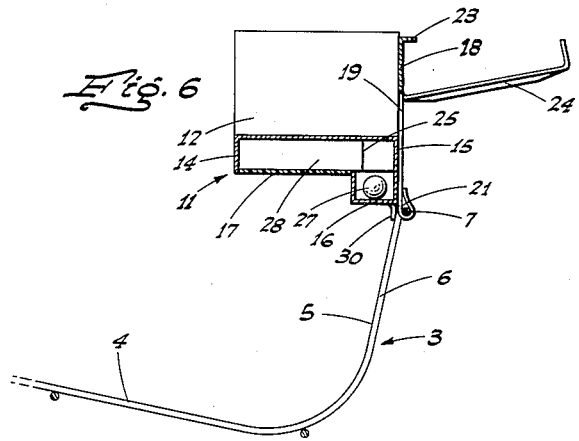
INVENTOR.
James H. Eggink
BY
Webster & Webster
ATTYS.

United States Patent Office 2,982,471
Patented May 2, 1961

2,982,471
EGG COUNTING DEVICE
James H. Eggink, P.O. Box 372, Ripon, Calif.
Filed June 11, 1959, Ser. No. 819,611
12 Claims. (Cl. 235—98)

This invention is directed to an egg counting device.

In commercial egg production the hens each occupy a separate cage of a battery, and each such cage includes— as an extension of the cage floor—an outwardly and downwardly inclined apron; each egg as laid by a hen rolling from the cage down such apron, whence it comes to rest against an upstanding stop wall at the lower end of said apron. The rancher daily collects any egg which so rests on the apron; it being the present practice to daily record—on a chart, and as to each cage—all eggs so collected. Such frequent manual recording has been found to be annoying and time-consuming.

It is therefore the major object of this invention to provide an egg counting device which is operative to automatically indicate the number of eggs collected, from the apron of a cage, over a given period of time—say a week or ten days. The rancher thus need only record— on a chart—the number of eggs collected by him, and reflected by the counting device, during any such period; the device then being readily manually reset to "zero." By avoiding daily chart entries, the keeping of a record of egg production is simplified and becomes relatively easy.

Another important object of this invention is to provide an egg counting device which is readily adaptable to existing cages of the type described; i.e., any cage having a forwardly and downwardly inclined egg receiving apron exposed exteriorly of said cage.

It is also an object of the invention to provide an egg counting device which is designed for ease and economy of manufacture, simplicity of installation on a cage, and convenience of use.

Still another object of the invention is to provide a practical and reliable egg counting device, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the egg counting device as mounted in connection with the apron of a cage; the device being shown in its normal position.

Fig. 2 is an enlarged cross section taken on line 2—2 of Fig. 1; the device remaining in its normal position.

Fig. 3 is a similar view, but shows the device in the position to which it is up-swung by an egg on the apron and resting against the upstanding stop wall.

Fig. 4 is an enlarged plan view of the egg counting device positioned as in Fig. 1.

Fig. 5 is a longitudinal sectional elevation of the egg counting device; the view being taken on line 5—5 of Fig. 4.

Fig. 6 is a view similar to Figs. 2 and 3, but shows the device as inverted to reset it to "zero."

Referring now more particularly to the drawings, and to the characters of reference marked thereon, the egg counting device, as hereinafter described, is adapted for use with a hen cage, indicated at 1, which cage includes a bottom 2 disposed at an outward and downward incline and which is extended a distance ahead of the cage in the form of a similarly inclined apron 3. The bottom 2 and the extended portion which forms the apron 3 includes upwardly exposed, transversely spaced, parallel rods 4; each pair of adjacent rods forming in effect a rollway down which an egg may gravitate in guided relation to the lower end of said apron 3.

At its lower end the apron 3 is formed with an upstanding egg stop wall 5 defined by upturned lower end portions 6 of the rods 4; such upturned end portions 6 being connected together by a top cross rod 7. Side retention rods 8 prevent any egg from rolling laterally off of the apron 3, so that each egg which gravitates from the cage 1 must run to and abut the stop wall 5; the front 9 of the cage having a lower edge termination, as at 10, a distance above the bottom 2 and apron 3 to permit of free passage of an egg out of the cage.

To the foregoing cage structure, which is substantially conventional, there is applied the novel egg counting device which is the subject of the present invention, and which device is constructed as follows:

A relatively shallow, rectangular but elongated, transversely narrow trough 11 is disposed immediately outwardly of the stop wall 5 in a crosswise position; such trough 11 including a bottom 12, ends 13, an outer side 14, and an inner side 15.

Additionally—and at the top—the trough 11 is covered, adjacent the inner side 15, by a full-length, inverted channel 16 closed at its extremities by the ends 13. Outwardly of such channel the remainder of the trough 11 is fully covered by a transparent top or window 17.

The trough 11 is normally disposed in the position shown, for example, in Figs. 1, 2, and 5, and wherein said trough inclines longitudinally downward from one end to the other, and also inclines laterally outward.

The trough 11 is mounted on the stop wall 5 in the foregoing position, and also for certain swinging movements, as follows:

A horizontal elongated bar 18 is disposed crosswise immediately outwardly of said stop wall 5, and such bar includes—adjacent the ends—upstanding ears 19 and 20 pivoted at 21 and 22, respectively, on the top cross rod 7. The trough 11 is fixed—at the back or inner side, as by spot welding or the like—to the ears 19 and 20. At its lower edge the bar 18, which is flat and disposed vertically on edge, is formed with an inturned stop flange 23, which normally abuts against the stop wall 5.

Additionally, the bar 18 is formed—in the length thereof—with a plurality of laterally inwardly and downwardly inclined fingers 24; there being one of such fingers corresponding, and centered with respect to the egg rollway defined by each pair of adjacent rods 4. The purpose of such fingers 24 will hereinafter appear.

The trough 11 is fitted with a multiplicity of equally longitudinally spaced, transverse partitions 25 which extend from the outer side 14 inwardly to a termination short of the inner side 15, while a multiplicity of other equally longitudinally spaced, transverse partitions 26 extend from the inner side 15 outwardly to a termination short of the outer side 14; the partitions 26 being spaced equi-distantly between adjacent partitions 25.

The distance between the inner ends of the partitions 25 and the inner side 15; the distance between the outer ends of the partitions 26 and the outer side 14; and the distance between adjacent partitions 25 and 26 are all slightly greater than the diameter of a relatively small ball 27 which comprises the actual counting or indicating element of the device.

With the foregoing arrangement of the partitions 25 and 26, a longitudinally extending, symmetrical, transversely zig-zag ball runway is formed in said trough 11; such runway including, between adjacent partitions 25, ball receiving compartments 28, in the outer portion of each of which—except the lowermost one—is a diagonal deflector 29. The deflectors 29 are disposed so that when the ball 27 is in any one of the compartments 28, it gravitates to and lies in the forward lower corner thereof.

As shown, the transparent top or window 17 is marked with numerical and sequential indicia above the compartments 28, starting with a "zero" above the uppermost compartment; the next and following compartments—in the direction of the downward slope of the trough 11—being correspondingly numbered "1," "2," "3," et seq.

In use of the above described egg counting device, the ball 27 is initially disposed in the "zero" compartment 28. Thereafter, upon an egg E gravitating down the apron 3 and coming to rest against the stop wall 5, it engages and depresses one of the fingers 24; i.e. swings such finger downwardly from the position of Fig. 2 to the position of Fig. 3. When this occurs, the trough 11 is swung upwardly to a laterally inwardly inclined position, whereupon the ball 27 rolls transversely in the "zero" compartment to the inner side 15, and thence longitudinally against the partition 26 of the next following compartment 28.

The ball remains in such position until the egg is collected by the rancher; i.e., removed from the apron 3. Upon such removal of the egg, the trough 11 swings back to its normal laterally outwardly inclined position; the ball then rolling laterally outwardly and being received in the "No. 15" compartment against the corresponding deflector 29, which causes the ball 27 to move to the lower corner of such latter compartment.

The counting device then reflects—by the numerical indicia on the transparent top or window 17—that one egg has been collected from the cage.

The foregoing sequence of operations is repeated with each subsequent egg; the ball 27—following the zig-zag runway in the trough 11—progressing downwardly in said trough, compartment by compartment, and to the end that the numerical indicia on the transparent top or window 17 automatically and accurately indicates the number of eggs which have been collected over a given period of time.

In the present illustration, the egg counting device will reflect the collection of ten eggs.

At the end of any such given period of time the rancher notes the number of eggs which have been collected, and as reflected by the counting device; a suitable entry being made on a chart.

It is then necessary to reset the egg counting device; i.e. to return the ball 27 to the "zero" compartment 28. This is accomplished by manually swinging the trough 11 upwardly and inwardly until it occupies an inverted position, as in Fig. 6, and in which position the channel 16 opens upwardly and slopes contra to the normal direction of incline of said trough 11. With the inversion of the trough 11, and at which time a stop 30 bears against the top cross rod 7, the ball 27 runs out of the compartment in which it is resting and drops into the channel 16, as shown in Fig. 6; the ball then running down such channel until it reaches the end corresponding to the "zero" compartment 28.

Next, the trough 11 is swung back to its normal position, whereupon the ball 27 runs into, and is received by, the starting or "zero" compartment 28, as shown particularly in Fig. 1. The egg counting device is then ready to start another series of egg counting operations.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An egg counting device for a cage having a downwardly sloping egg receiving apron in front of the cage down which eggs from the cage roll and which apron terminates in an upstanding front wall having a top rod along its upper edge; the device comprising a rigid trough extending along the apron wall in front of the same, hangers on the trough at the back and at the top thereof engaging over the rod and forming pivot and supporting means for the trough so that the latter tends to swing down and abut against said wall, and a finger rigid with the trough and projecting back from said wall above the apron and positioned for egg engagement and depression by an egg on the apron reaching the wall whereby to swing the trough forwardly about the pivot means; there being egg counting means in the trough functioning upon each successive return of the trough to its initial position upon the successive removal of wall-engaged eggs from the apron to successively indicate the number of eggs so removed.

2. An egg counting device for a cage having a downwardly sloping egg receiving apron in front of the cage down which eggs from the cage roll, the device comprising a trough extending along the apron in front of the same, means mounting the trough on the apron for upward and downward swinging movement, an element on the trough engageable by an egg on the apron and then swinging the trough up from an initial downward position, the trough reassuming such downward position upon removal of such egg, and counter means in the trough including a plurality of successively visually numbered compartments therein, a movable element initially in one end compartment, and means provided with the trough and including partitions between the compartments arranged to cause the element to successively move from one compartment to the adjacent one upon successive up and down swinging movement of the trough.

3. An egg counting device for a cage having an egg-receiving support exteriorly thereof; said device comprising a counter operative upon successive upward and downward swinging movements thereof, means mounting the counter in connection with the support for such movements, and means associated with the counter operative to swing the same upward in response to reception of an egg on the support and to permit downward swinging of the counter only upon removal of the egg from said support; the counter including an elongated trough normally disposed at a longitudinal incline from one end to the other and laterally inclined toward one side, the counter mounting means being arranged so that the longitudinal incline thereof remains but the lateral incline is reversed upon such upward swinging of said counter, means in the trough defining a longitudinally extending transversely zig-zag runway having successive compartments, a ball in the trough operative upon recurrent upward and downward swinging movements of the counter to gravitationally progress in said runway from compartment to compartment, starting from the one at the high end of said inclined trough, and visual indicia on the counter related to said compartments.

4. An egg counting device, as in claim 3, in which the mounting means is arranged to permit the counter to be swung to a position with the trough inverted; and means on the trough to then receive the ball from any such compartment and for guided gravitational return to a position for entry into said high end compartment upon swinging of said counter back to normal position.

5. An egg counting device for a cage having an egg-receiving support exteriorly thereof; said device comprising a counter operative upon successive upward and downward swinging movements thereof, means mounting the counter in connection with the support for such movements, the counter including means forming a longitudinal transversely zig-zag runway having compartments, a ball initially disposed in one end of such runway, the counter being mounted so that upon recurrent upward and downward swinging movements thereof the ball progresses in said runway from compartment to compartment, visual indicia on the counter related to said compartments, and means associated with the counter operative to swing the same upward in response to reception of an egg on the support and to permit downward swinging of the counter only upon removal of the egg from said support.

6. An egg counting device for a cage having an egg-receiving support exteriorly thereof; said device comprising a counter operative upon successive upward and downward swinging movements thereof, means mounting the counter in connection with the support for such movements, and means associated with the counter operative to swing the same upward in response to reception of an egg on the support and to permit downward swinging of the counter only upon removal of the egg from said support; the support being inclined and having an upstanding stop wall against which the egg engages, said mounting means pivoting the counter on the stop wall for such movements, and said counter swinging means including a depressible finger normally overlying the support adjacent the stop wall, the finger being engaged and depressed by the egg when in engagement with said stop wall.

7. An egg counting device for a cage including an inclined exterior apron having an upstanding stop wall at its lower end, each egg from the cage rolling down the apron to engagement with the stop wall; said device comprising an elongated trough disposed transversely of the apron outwardly of the stop wall, the trough normally inclining downwardly from one end to the other and inclining laterally toward the outer side, means pivotally mounting the trough in connection with the stop wall for upward swinging movement from its normal position to a raised position with the trough inclining laterally toward the inner side while maintaining the longitudinal incline of said trough, means in the trough forming a longitudinal transversely zig-zag runway having successive numerically identified compartments, a ball initially disposed in the compartment adjacent said one end of the trough, the ball being rollable in and progressing along said runway compartment to compartment upon recurrent swinging of the trough upward to raised position and back to normal position, and means associated with the trough and actuated by an egg received on the apron and engaging the stop wall operative to swing the trough upward to raised position and to permit the trough to swing back to normal position when the egg is removed from the apron.

8. An egg counting device, as in claim 7, in which the top wall includes a horizontal top cross rod, and said trough mounting means comprises upstanding ears secured in connection with the trough and pivoted on said top cross rod.

9. An egg counting device, as in claim 7, in which the stop wall is of skeleton construction and includes a horizontal top cross rod and openings therebelow; the trough mounting means comprising a horizontal bar in front of the stop wall but below the top cross rod, spaced rigid ears upstanding from the bar and pivoted on said top cross rod, the trough being fixed to the bar and ear unit; and the trough swinging means including, with the bar, a plurality of rigid fingers projecting from said bar through openings in the stop wall and normally overhanging the adjacent portion of the apron for depression by an egg on the apron in engagement with the stop wall.

10. An egg counting device, as in claim 7, in which the trough comprises a bottom, ends, an outer side, and an inner side; the runway forming means including transverse partitions extending in the trough alternately from the outer and inner sides thereof in spaced relation longitudinally of said trough and terminating short of the opposite side, and a transparent top on the trough substantially covering the runway; there being numerical indicia on the top above the compartments of said runway.

11. An egg counting device, as in claim 10, including an inverted longitudinal channel on the trough immediately adjacent the inner side and at the inner margin of the transparent top; the trough being manually swingable upwardly and inwardly to an inverted position above the apron whereby to reverse the incline of said trough and channel and so that the ball then transfers from any compartment into the channel and rolls therealong to its then lowermost end for return to the compartment at the uppermost end of the trough when the latter is manually swung back to its normal position.

12. An egg counting device for a cage including an inclined exterior apron having an upstanding stop wall at its lower end, each egg from the cage rolling down the apron to engagement with the stop wall, and the latter being of skeleton construction having a horizontal top cross rod and openings therebelow; comprising a horizontal bar disposed outwardly of the stop wall below the top cross rod, spaced ears upstanding from the bar and pivoted on the top cross rod, longitudinally spaced fingers rigid with the bar and projecting therefrom through the stop wall openings in normally overhanging relation to the adjacent portion of the apron, the fingers being adapted to be depressed by an egg on the apron in engagement with the stop wall, an elongated trough disposed transversely of the apron outwardly of the stop wall, said trough being mounted on the bar and ear unit, the trough normally inclining downwardly from one end to the other and inclining laterally outwardly, the trough including a bottom, ends, an outer side, an inner side, a transparent top, the latter terminating at its inner edge short of the inner side, and an inverted longitudinal channel extending full length of the trough between said inner edge of the top and said inner side; transverse partitions extending in the trough alternately from the outer and inner sides thereof in spaced relation longitudinally of said trough and terminating short of the opposite side whereby to define a longitudinal transversely zig-zag runway having successive compartments, and a ball in the trough adapted to roll in said runway advancing from compartment to compartment upon recurrent up and down swinging of the trough or return in said channel upon inversion of said trough.

References Cited in the file of this patent

UNITED STATES PATENTS

| | | |
|---|---|---|
| 627,360 | Sturges | June 20, 1899 |
| 2,305,708 | Jacobsen | Dec. 22, 1942 |
| 2,753,115 | Lawrence | June 6, 1955 |
| 2,940,667 | Hawkes | June 14, 1960 |